United States Patent [19]
Chen

[11] Patent Number: 5,975,469
[45] Date of Patent: Nov. 2, 1999

[54] ELBOW SUPPORTER FOR A COMPUTER MOUSE AND KEYBOARD

[76] Inventor: Shih-Yu Chen, No. 3, Alley 11, Lane 15, Yung Fu Street, Hsin Shih Hsiang, Tainan Hsien, Taiwan

[21] Appl. No.: 09/140,769

[22] Filed: Aug. 26, 1998

[51] Int. Cl.[6] .................................................. B43L 15/00
[52] U.S. Cl. ........................................ 248/118.1; 248/918
[58] Field of Search .................................. 248/118.1, 118, 248/118.3, 918; 400/715; 345/156

[56] References Cited

U.S. PATENT DOCUMENTS

| | | | |
|---|---|---|---|
| 2,642,250 | 6/1953 | Kasnowich | 248/118 X |
| 5,074,501 | 12/1991 | Holtta | 248/118.3 |
| 5,402,972 | 4/1995 | Schmidt | 248/118 |
| 5,405,109 | 4/1995 | Nordnes | 248/118.3 |

*Primary Examiner*—Ramon O. Ramirez
*Attorney, Agent, or Firm*—Rosenberg, Klein & Bilker

[57] ABSTRACT

An elbow supporter for a computer mouse and keyboard includes a clamp for clamping the supporter on a table of a computer, a threaded rod combined with the clamp and further with a connecter threadably engaging the threaded rod, a first pivotal arm pivotally connected to the connecter at a first end, a first end of a second pivotal arm pivotally connected to a second end of the first pivotal arm. An elbow support disc is fixed on a second end of the second pivotal arm so the elbow support disc may be lifted or lowered by rotating the second threaded rod clockwise or counterclockwise. A mouse sheet is fixed on and moved together with the first pivotal arm, so the mouse sheet may also move up or down together with the elbow support disc.

3 Claims, 10 Drawing Sheets

ELBOW SUPPORTER FOR A COMPUTER MOUSE AND KEYBOARD

BACKGROUND OF THE INVENTION

This invention relates to an elbow supporter for a computer mouse and keyboard, particularly to one supporting an elbow in using a mouse or keyboard, for lessening elbow's pain caused by a long period of using a computer.

As scientific technology has developed, computers have been used more and more widely in schools, institutions, private offices and even at homes. Whether using keyboard of a computer or using a mouse, the elbow is always in a hanging condition, liable to become tired and painful after a long period of working. So an elbow supporter for a computer has been made and in use nowadays and adjustable in its height to suit to the bodily height of a user.

Figure 12:
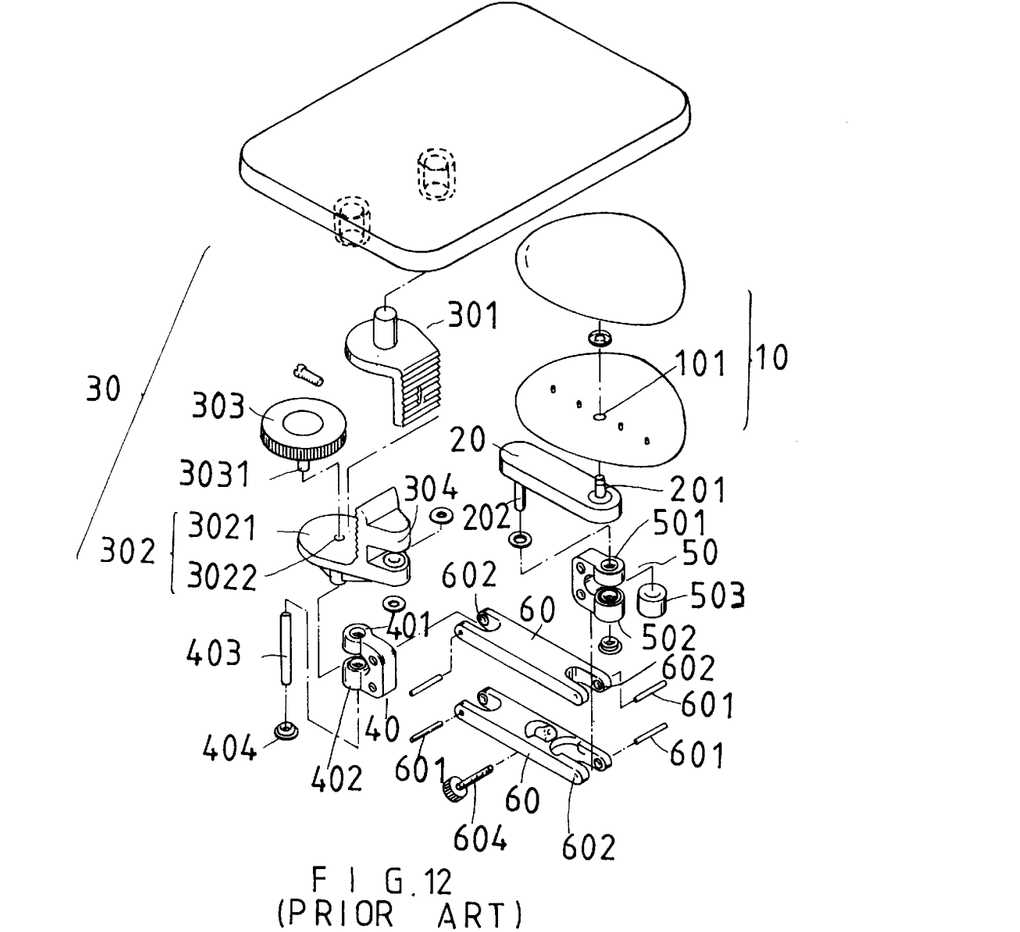
FIG. 12 is an exploded perspective view of a conventional elbow supporter for a computer mouse and keyboard; and, FIG. 13 is a side cross-sectional view of the conventional elbow supporter for a computer mouse and keyboard.
Figure 13:
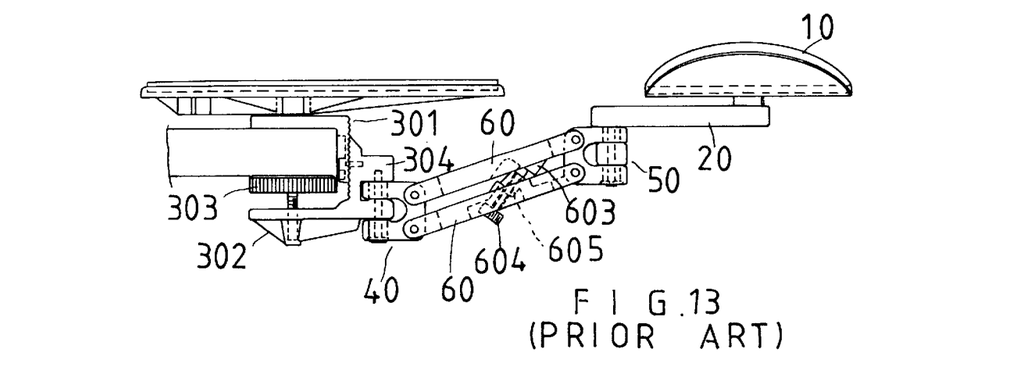

There is a conventional elbow supporter and a mouse sheet as shown in FIGS. 12 and 13, including an elbow support base 10, an upper arm 20, a clamp 30, a front turning base 40, a rear turning base 50, and two parallel arms 60.

The elbow support base 10 has a center hole 101 for a shaft of the upper arm 20 to fit firmly therein.

The upper arm 20 is provided to be located between the elbow support base 10 and the rear turning base 50.

The clamp 30 consists of an upper half clamp 301 and a lower half clamp 302, respectively having a vertical toothed surface 301 and 302 to engage with each other, and a long hole and a threaded hole for a bolt to engage for adjusting clamping distance between the upper and the lower half clamp 301 and 302. The lower half clamp 302 has a flat surface 3021 and a threaded hole 3022 in the flat surface 3021 for a bolt 3031 of an intermediate disc 303 to engage for adjusting the distance between the upper surface of the intermediate disc 303 and a lower surface of the upper half clamp 301. The lower half clamp 302 further has a shaft base 304 base in a rear portion to combine with an arm 401 of the front turning base 40.

The front turning base 40 has two arms 401, 402 spaced apart vertically with an opening, with the arm 401 combined with the shaft base 304 as described above, and the other arm 402 under the bottom of the shaft base 304 for a pivotal shaft 403 to fit through the two arms 401, 402 and the shaft base 304 so as to let the front turning base 40 swing. Further a cap 404 closes under the shaft 403 and the bottom end of the front turning base 40 to prevent the pivotal shaft 403 from falling off.

The rear turning base 50 has two arms 501 and 502 with a center hole for a lower shaft 202 of the upper arm 20 to fit therein and through a gasket 503 fitted in an aperture between the two arms 501, 502, secured with the upper arm 20.

The two parallel arms 60 respectively have their two ends bored with a pin hole 602 for a pin 601 to fit therein and further in pin holes of the front and the rear turning base 40 and 50, combined with the front and the rear turning base 40, 50 so that contained angles of the two parallel arms 60 with the front and the rear turning base 40 and 50 may be adjusted. Further, a push block 603 is provided under the upper parallel arm 60, and the lower parallel arm 60 has threaded hole 605 for a bolt 604 to engage for altering the aperture between the two parallel arms 60 so that the height of the elbow support base 10 may be changed to permit the same base 10 move freely together with the elbow in typing the keyboard or moving the mouse.

However, the conventional elbow supporter and the mouse sheet has in practical use a drawback that the position of the mouse sheet is stationary when a user adjusts the height of the elbow support base. Consequently, the user can only adjust the position of the elbow support base to cope with the condition, but the user feels comfortable only for the part from the elbow to the shoulder, but as for the part between the elbow and the hand, it cannot cope with the mouse sheet stationary in its position, maybe too high or too low for the hand to handle, inconvenient and uncomfortable.

SUMMARY OF THE INVENTION

The purpose of the invention is to offer an elbow supporter for a computer mouse and keyboard, which includes a clamp having a threaded rod fixed at one end, a connecter threadably connected to the threaded rod pivotally connected to an end of a first pivotal arm, a second pivotal arm pivotally connected to the other end of the first pivotal arm, an elbow support disc fixed on one end of the second pivotal arm, a mouse sheet fixed on the first pivotal arm. Then the elbow support base may be lifted or lowered by turning the threaded rod with a turning disc fixed at a lower end of the threaded rod, and the mouse sheet may also be lifted or lowered together with the elbow support base by means of the connecter fixed with the first pivotal arm pivotally connected to the second pivotal arm at the same time.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
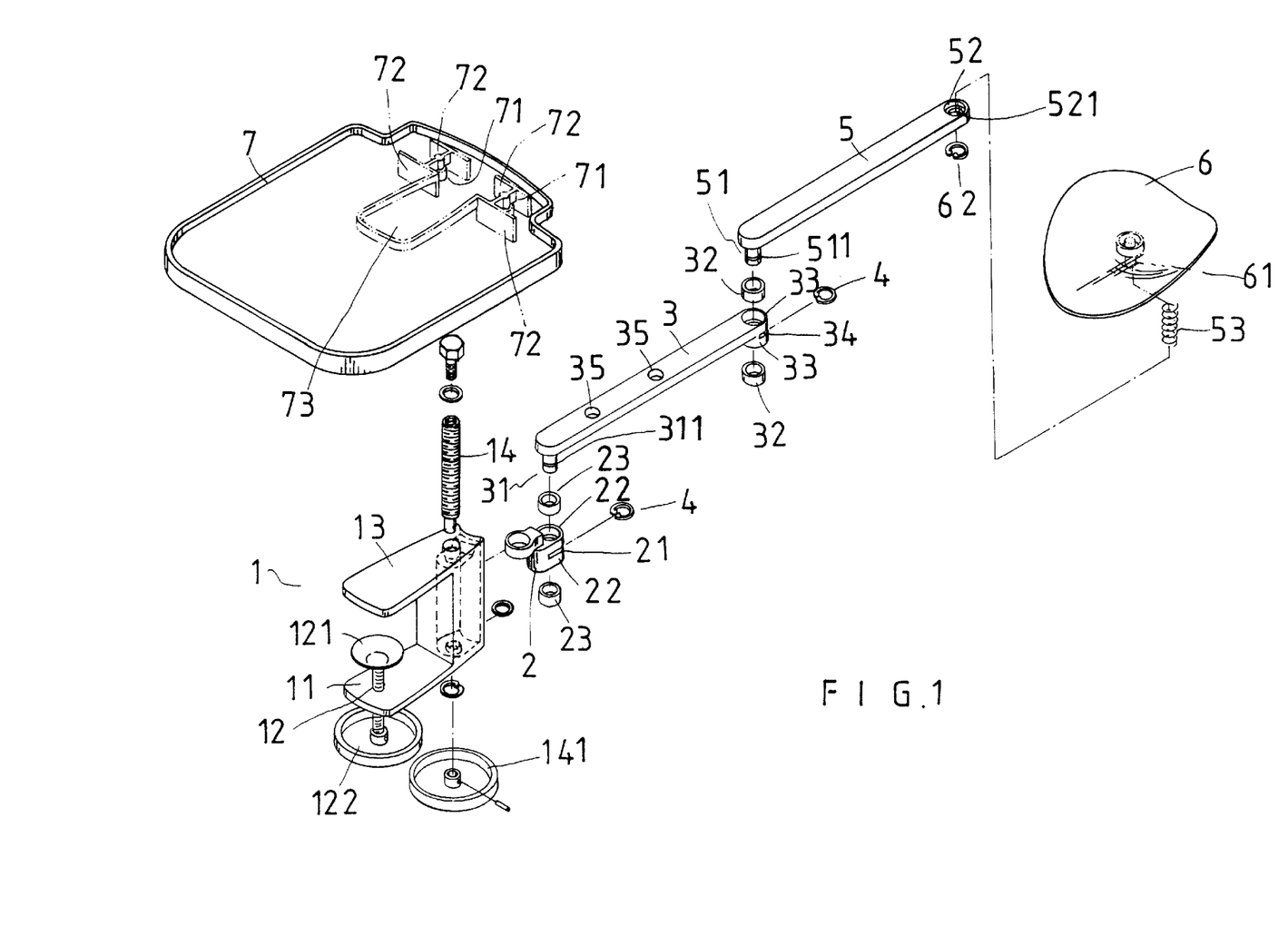
FIG. 1 is an exploded perspective view of an elbow supporter for a computer mouse and keyboard of the present invention.
Figure 2:
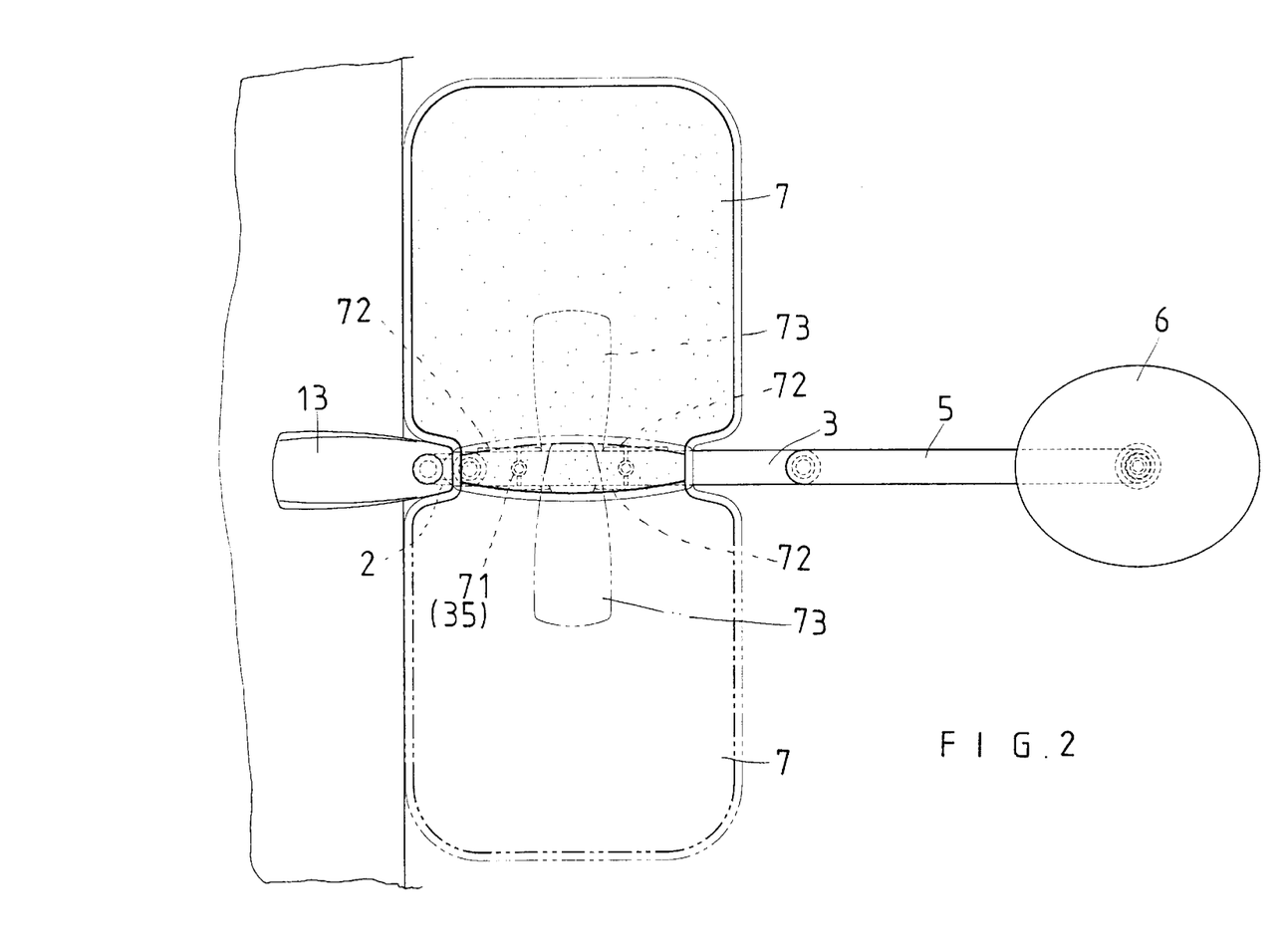
FIG. 2 is an upper view of the elbow supporter for a computer mouse and keyboard of the present invention.
Figure 3:
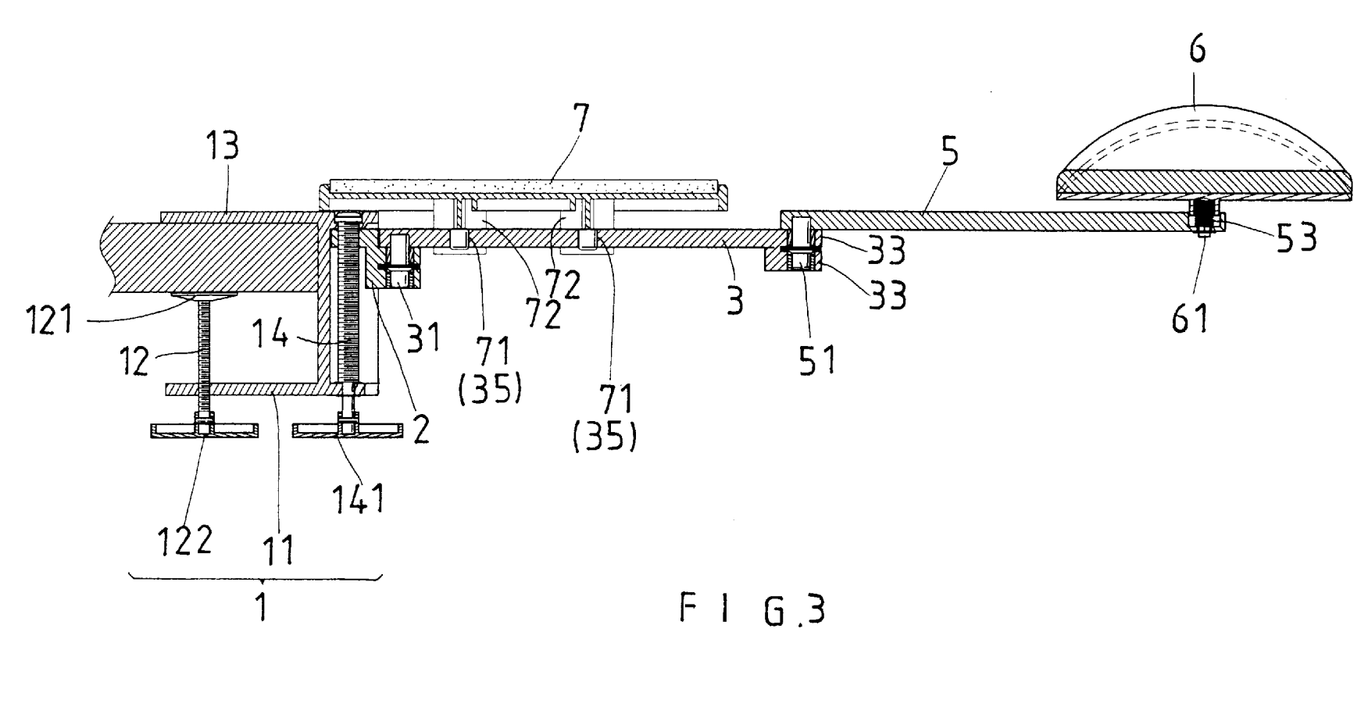
FIG. 3 is a side cross-sectional view of the elbow supporter for a computer mouse and keyboard of the present invention.
Figure 4:
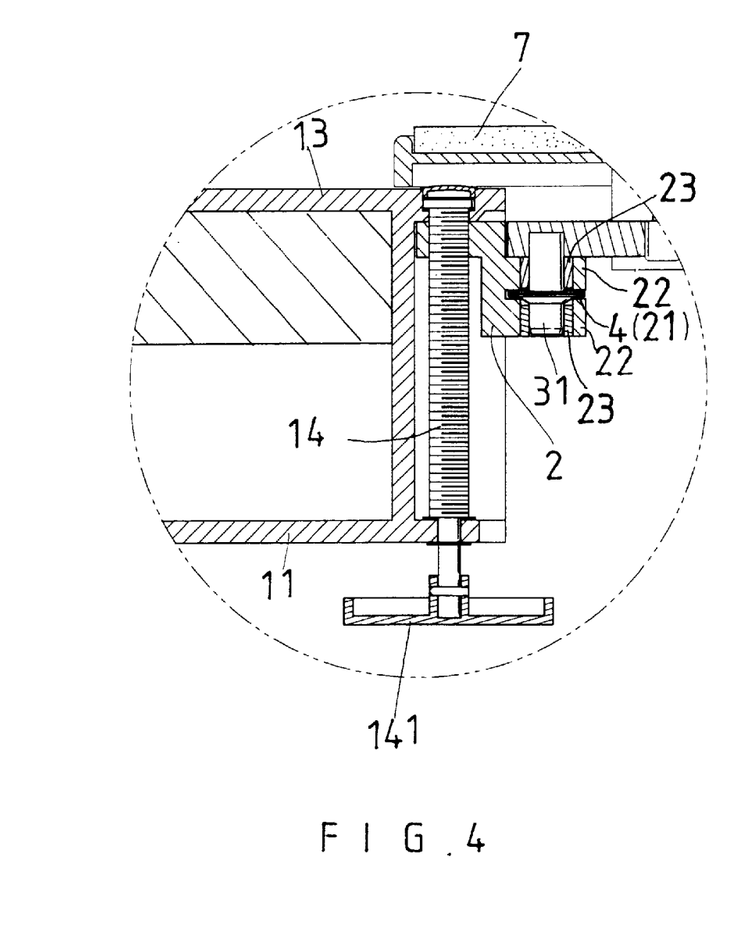
FIG. 4 is a partial cross-sectional view of the elbow supporter for a computer mouse and keyboard of the present invention.

A preferred embodiment of an elbow supporter for a computer mouse and keyboard, as shown in FIGS. 1, 2 and 3, includes a clamp 1 consisting of an upper plate 13 and a lower plate 11. The lower plate 11 has a first threaded rod 12 vertically and threadably engaging with an outer end, and the threaded rod 12 has an upper disc 121 at an upper end and a turning disc 122 at a lower end. The upper and the lower plate 13 and 11 have an inner end connected with a vertical portion and a second threaded rod 14 fixed in the vertical portion as shown in FIG. 4. The second threaded rod 14 has a turning disc 141 at a lower end, threadably engaging with a connecter 2. The connecter 2 has a projecting portion 22 provided with a center gap 21, and a shaft sleeve 23 respectively fitted in an upper section and a lower section of the projection portion 22.

Figure 5:
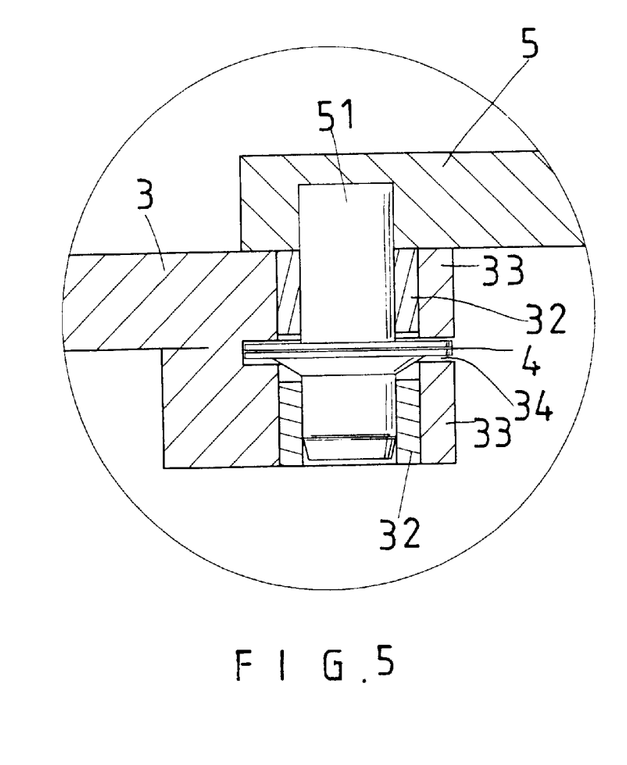
FIG. 5 is another partial cross-sectional view of the elbow supporter for a computer mouse and keyboard of the present invention.

The elbow supporter further has a first pivotal arm 3, which has one end formed with a downward pivotal post 31 with an annular groove 311 at its lower end. After the pivotal post 31 inserts in the projecting portion 22 of the connecter 2, a locking ring 4 is placed in the gap 21 and engages the annular groove 311 of the pivotal post 31, pivotally connecting the first pivotal arm 3 to the connecter 2. Further, the first pivotal arm 3 has two projections 33 formed at the other end and spaced apart with a gap 34, and each projection 33 has a shaft sleeve 32, as shown in FIG. 5.

Figure 6:
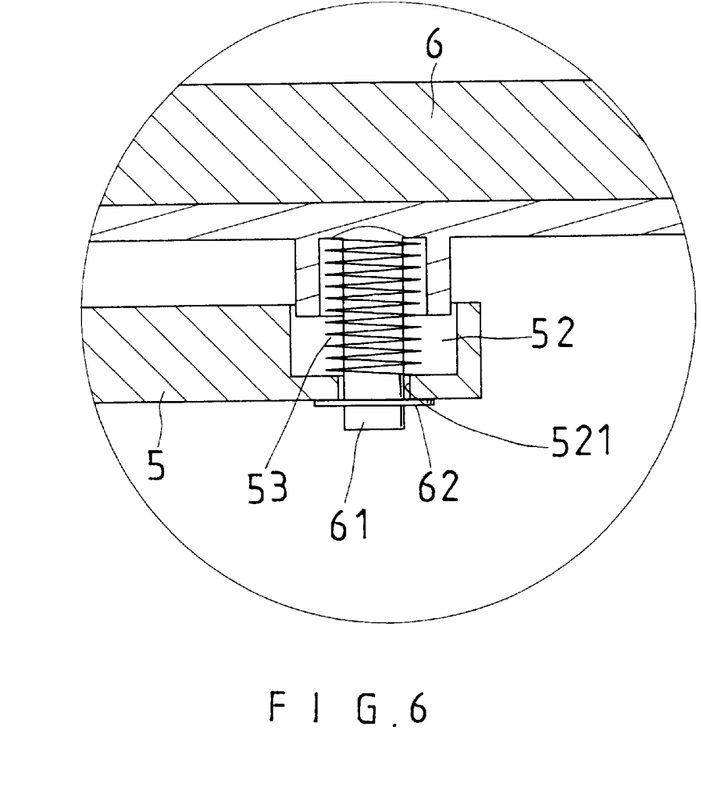
FIG. 6 is another partial cross-sectional view of the elbow supporter for a computer mouse and keyboard of the present invention.

Further, a second pivotal arm 5 is provided in the elbow supporter, having a downward pivotal post 51 with an annular groove 511 at its lower end. After the pivotal post 51 inserts through the two projections 33, a locking ring 4 is placed in the gap 34 between the two projections 33 and engages with the annular groove 511 of the pivotal post 51, pivotally connecting the first and the second pivotal arm 3 and 5. The second pivotal arm 5 further has a recessed cell 52 in the other end, as shown in FIG. 6. The recessed cell 52 has a hole 521.

Further, an elbow support disc 6 is provided, shaped to curve up from the center to a circumferential edge, and a locking means 61 fixed to extend down from the center. The locking means 61 protrudes through a coil spring 53 contained in the recessed cell 52 of the second pivotal arm 5, through the hole 521 and then engages with a locking ring 62, securing the elbow support base 6 on the end of the second pivotal arm 5.

Figure 8:
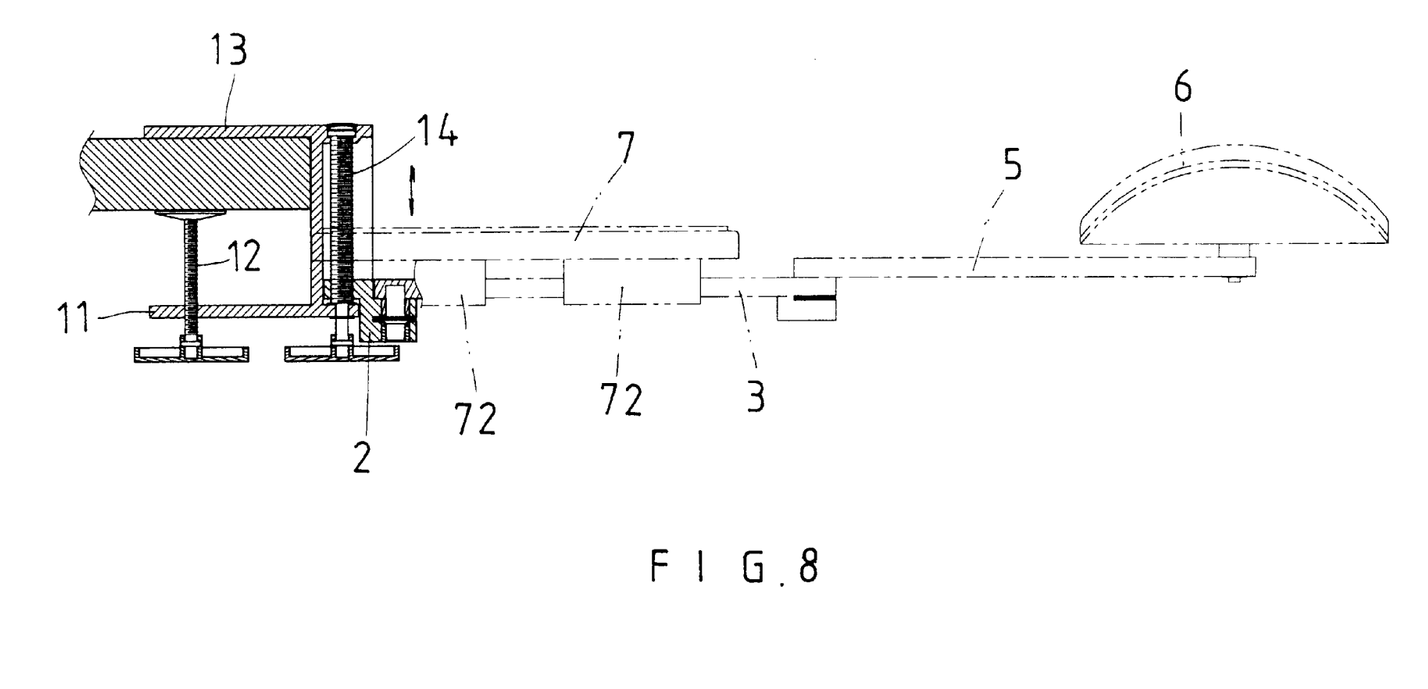
FIG. 8 is a side cross-sectional view of the elbow supporter for a computer mouse and keyboard of the present invention, showing how to adjust its height.
Figure 9:
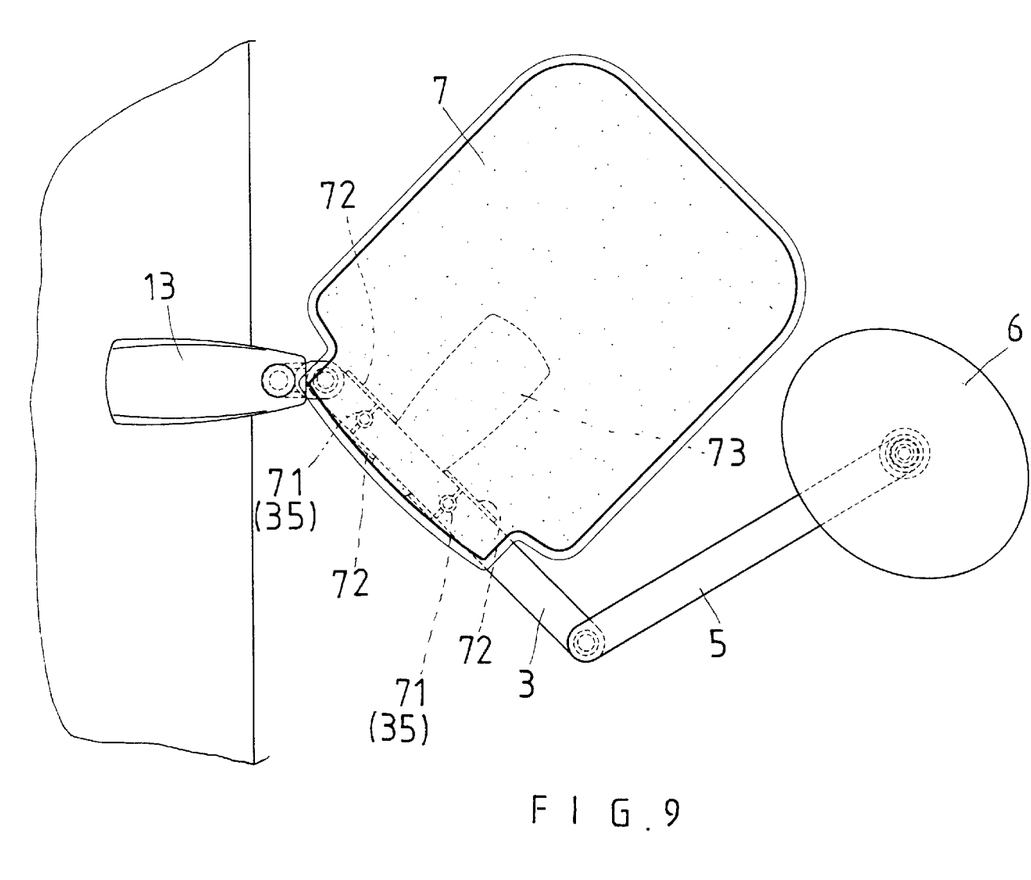
FIG. 9 is another side cross-sectional view of the elbow supporter for a computer mouse and keyboard of the present invention, showing how to adjust its height.
Figure 10:
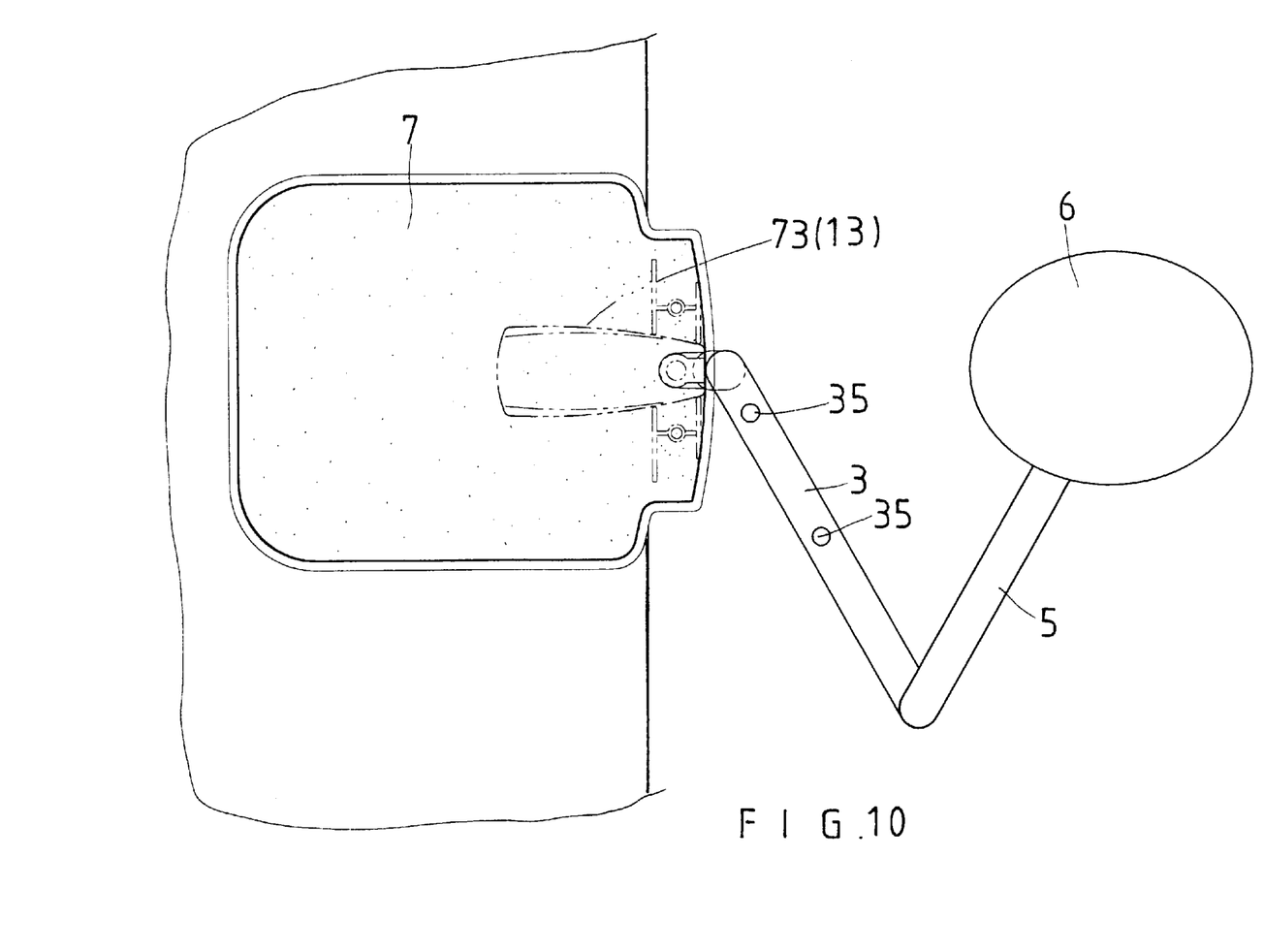
FIG. 10 is an upper view of the elbow supporter for a computer mouse and keyboard of the present invention showing it used in another way.
Figure 11:
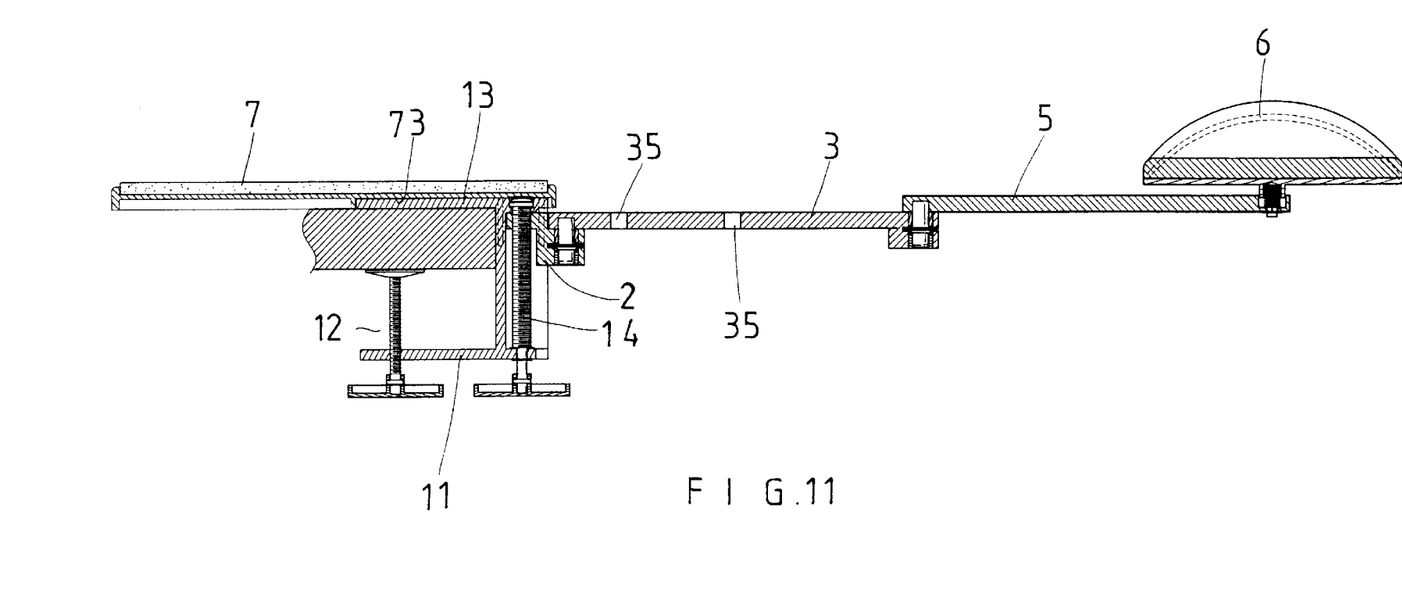
FIG. 11 is a side cross-sectional view of the elbow supporter for a computer mouse and keyboard of the present invention, showing it used in another way.

After the connecter 2, the first pivotal arm 3, the second pivotal arm 5 and the elbow support disc 6 are assembled together, the connecter 2 may be lifted or lowered if the turning disc 141 fixed with the threaded rod 14 is rotated clockwise or counterclockwise, as shown in FIG. 8. Thus, the elbow support disc 6 is adjusted in its height. At the same time, the connecter 2, the first and the second pivotal arm 3 and 5 are pivotally connected with one another, so a user may adjust their contained angles to permit his/her arm comfortable in moving the mouse or typing the keys, as shown in FIG. 9.

Figure 7:
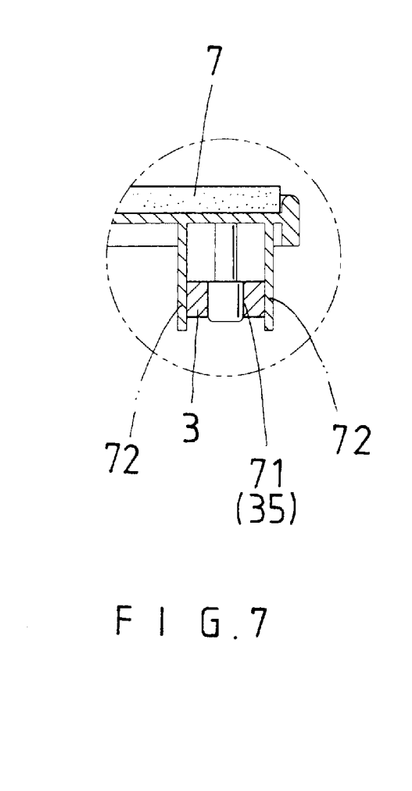
FIG. 7 is another partial cross-sectional view the elbow supporter for a computer mouse and keyboard of the present invention.

Further, the first pivotal arm 3 has two holes 35 spaced apart nearer the front end as shown in FIGS. 1 and 2, and the mouse sheet 7 has two vertical posts 71 spaced apart on a lower surface and at a right side (in FIG. 1) to fit in the two holes 35 of the first pivotal arm 3. The mouse sheet 7 further has a pair of parallel limit plates 72 respectively at two sides of each post 71 spaced apart with a little larger distance than the width of the first pivotal arm 3, as shown in FIG. 7. After the two posts 71 fit in the holes 35 of the first pivotal arm 3, the two pairs of the limit plates 72 are located at two sides of the first pivotal arm 3, securing the mouse sheet 7 with the first pivotal arm 3. Then the mouse sheet 7 may move up or down together with the first pivotal arm 3, when the second threaded rod 14 is rotated to lift or lower the connecter 2.

Further, the mouse sheet 7 has a recess 73 formed on the lower surface between the two posts 71 and having the same shape as the upper plate 13 of the clamp 1. Then the mouse sheet 7 can be placed and secured on the upper plate 13, with the recess 73 fitting with the upper plate 13, in case that the mouse sheet 7 is not used.

As can be understood in the aforesaid description, the elbow supporter in the present invention has the following advantages.

1. The mouse sheet can moves up or down together with the first pivotal arm, permitting a user using the mouse comfortable, when the elbow support disc is lifted or lowered by rotating the turning disc of the threaded rod according to the user's bodily height.

2. The mouse sheet may be removed off the first pivotal arm in case that a user works with typing the keys of a computer, and placed and secured on the clamp, with the recess of the mouse sheet fitting with the upper plate of the clamp, for avoiding the mouse sheet to obstruct typing the keys.

What is claimed is:

1. An elbow supporter for a computer mouse and keyboard comprising a clamp for clamping said supporter on a table, said clamp having a lower plate and an upper plate and a vertical portion connecting said lower and said upper plate together, a first threaded rod vertically engaging threadably a free end of said lower plate and fixed with a clamping disc at an upper end and a turning disc fixed to a lower end; a second threaded rod vertically engaging threadably with said vertical portion, said second threaded rod having a turning disc fixed to a lower end thereof a connecter threadably connected to said second threaded rod, said connecter having one end pivotally connected to a first end of a first pivotal arm, a mouse sheet having a pair of posts extending from a lower surface thereof, said first pivotal arm having two holes for receiving said pair of posts therein, a second pivotal arm having a first end pivotally connected to a second end of said first pivotal arm, an elbow support disc having an upwardly curved shape fixed on a second end of said second pivotal arm; said connecter being lifted or lowered by clockwise or counterclockwise rotation of said second threaded rod when said turning disc of said second threaded rod is rotated, said mouse sheet also being moved up or down together with said elbow support disc.

2. The elbow supporter for a computer mouse and keyboard as claimed in claim 1, wherein said connecter further has two projections spaced apart with an aperture formed at one end portion, said first pivotal arm having a downwardly directed pivotal post at the first end, said pivotal post having an annular groove at a lower end, a locking ring engaging said annular groove, to combine said connecter with said first pivotal arm subsequent to said pivotal post being received in said two projections of said connecter.

3. The elbow supporter for a computer mouse and keyboard as claimed in claim 1, said first pivotal arm further having two projections formed at the second end and spaced apart with an aperture, and said second pivotal arm further having a downwardly directed pivotal post at the first end, said pivotal post being formed with an annular groove at a lower end, a locking ring inserted in said aperture of said first pivotal arm and engaging said annular groove of said pivotal post of said second pivotal arm subsequent to said pivotal post being received in said two projections of said first pivotal arm for pivotally connecting said first pivotal arm to said second pivotal arm.

\* \* \* \* \*